US006832940B2

(12) United States Patent
Itoi

(10) Patent No.: US 6,832,940 B2
(45) Date of Patent: Dec. 21, 2004

(54) ELECTRONIC CONTROLLED DRIVE APPARATUS

(75) Inventor: Makoto Itoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/750,973

(22) Filed: Jan. 5, 2004

(65) Prior Publication Data

US 2004/0142611 A1 Jul. 22, 2004

(30) Foreign Application Priority Data

Jan. 10, 2003 (JP) ....................................... 2003-004581

(51) Int. Cl.[7] ................................................ B60K 41/00
(52) U.S. Cl. .............................. 440/86; 440/1; 477/115
(58) Field of Search ................................ 440/1, 84, 86, 440/87; 477/115, 116, 125; 701/21

(56) References Cited

U.S. PATENT DOCUMENTS 5,827,150 A * 10/1998 Mukumoto ................. 477/101
6,102,755 A * 8/2000 Hoshiba ........................ 440/1
6,587,765 B1 * 7/2003 Graham et al. ............... 701/21
6,679,740 B1 * 1/2004 Imanaka et al. .............. 440/75

FOREIGN PATENT DOCUMENTS

JP 10-131778 A 5/1998
JP 3278949 B2 2/2002
JP 3283405 B2 3/2002

* cited by examiner

*Primary Examiner*—Andrew Wright
(74) *Attorney, Agent, or Firm*—Sughrue Mion, PLLC

(57) ABSTRACT

The electronic controlled drive apparatus includes: a throttle actuator (11) that opens or closes a throttle of an internal combustion engine in accordance with a target throttle opening degree; a shift actuator (12) that actuates a shift in accordance with a target shift position; an engine rotation number holding unit (step S4) for obtaining an engine rotation number when the target shift position is released and holding the obtained engine rotation number; and a waiting time calculating unit (step S5) for calculating a shift drive waiting time in accordance with the held engine rotation number. In the electronic controlled drive apparatus, counting of the shift drive waiting time is started when the target shift position is released (steps S6 and S7), and the shift actuator is allowed to be drive (step S9) after a lapse of the shift drive waiting time (step S8).

3 Claims, 6 Drawing Sheets

FIG. 3

| Ne(rpm) | 6000 | 5000 | 4000 | 3000 | 2000 | 1500 | 1000 | 750 |
|---|---|---|---|---|---|---|---|---|
| Kwait(ms) | 100 | 100 | 100 | 50 | 20 | 10 | 2 | 0 |

ELECTRONIC CONTROLLED DRIVE APPARATUS

BACKGROUND OF THE INVENTION

1. Field of the Invention

The present invention relates to an electronic controlled drive apparatus, and more particularly to an electronic controlled drive apparatus which is mounted on a moving vehicle such as a boat, to conduct drive control of an internal combustion engine provided in the moving vehicle.

2. Description of the Related Art

In a marine field, there has been generally used a boat that is provided with an outboard engine in the rear of the boat, and which moves forward or backward according to the rotational direction of a propeller provided below the outboard engine. When such a boat in a forward running state is suddenly stopped in case of an emergency while driving the boat, or in the case where the boat is brought alongside the pier, a boat driver has conducted a switching operation in the order of “forward (F: advance)”, “neutral (N)”, and “reverse (R: backward)” using a shift lever to stop the boat because the boat is not provided with a brake (for example, see JP 3278949 B).

However, there are the following problems with respect to such a conventional method. When a forward speed is high, even if the operation mode is switched to the “neutral” by the shift lever to cut drive power to the propeller, the boat continues to run forward for some time and the propeller continues to rotate slowly forward according to a flow due to the forward running of the boat. Therefore, in order to immediately stop the boat in this state, when the operation mode is switched to the “reverse” mode by the shift lever to reverse the rotational direction of the propeller, an extremely large load is applied to the engine, thereby temporarily and suddenly reducing the number of revolutions of the engine. Thus, in particular, an engine having small torque in a low rotation region causes engine stalling, and therefore the boat cannot be adequately stopped.

SUMMARY OF THE INVENTION

The present invention has been made to solve the above-mentioned problem. Therefore, an object of the present invention is to obtain an electronic controlled drive apparatus capable of reducing a load applied to an engine by conducting shift connection after a rotation speed of the drive axis of a propeller is sufficiently reduced upon a rapid shift reverse operation to thereby prevent a defect such as engine stalling.

According to the present invention, there is provided an electronic controlled drive apparatus that conducts drive control of an internal combustion engine which is provided in a moving vehicle, the electronic controlled drive apparatus including: control means having an operational lever. The electronic controlled drive apparatus also includes target value calculating means for calculating a target throttle opening degree and a target shift position based on an inputted position of the operational lever. Further, the electronic controlled drive apparatus includes a throttle actuator that opens or closes a throttle of the internal combustion engine in accordance with the target throttle opening degree by an operation of the control means. In addition, the electronic controlled drive apparatus includes a shift actuator that actuates a shift in accordance with the target shift position by an operation of the control means. The electronic controlled drive apparatus also includes engine rotation number holding means for obtaining an engine rotation number when the target shift position is released and holding the obtained engine rotation number. The electronic controlled drive apparatus further includes waiting time calculating means for calculating a shift drive waiting time in accordance with the held engine rotation number. In the electronic controlled drive apparatus, the control means starts counting of the shift drive waiting time when the target shift position is released, and allows the shift actuator to be driven after a lapse of the shift drive waiting time. Thereby, the load applied to the engine can be reduced to prevent a defect such as engine stalling by conducting shift connection after the rotation speed of the drive axis of the propeller is sufficiently reduced upon the rapid shift reverse operation.

BRIEF DESCRIPTION OF THE DRAWINGS

In the accompanying drawings:

FIG. 3 shows an explanatory example of a map of shift drive waiting times set in advance in accordance with a rotation number of an engine in the electronic controlled drive apparatus according to the embodiment of the present invention;

DETAILED DESCRIPTION OF THE PREFERRED EMBODIMENT

Embodiment 1

Figure 1:
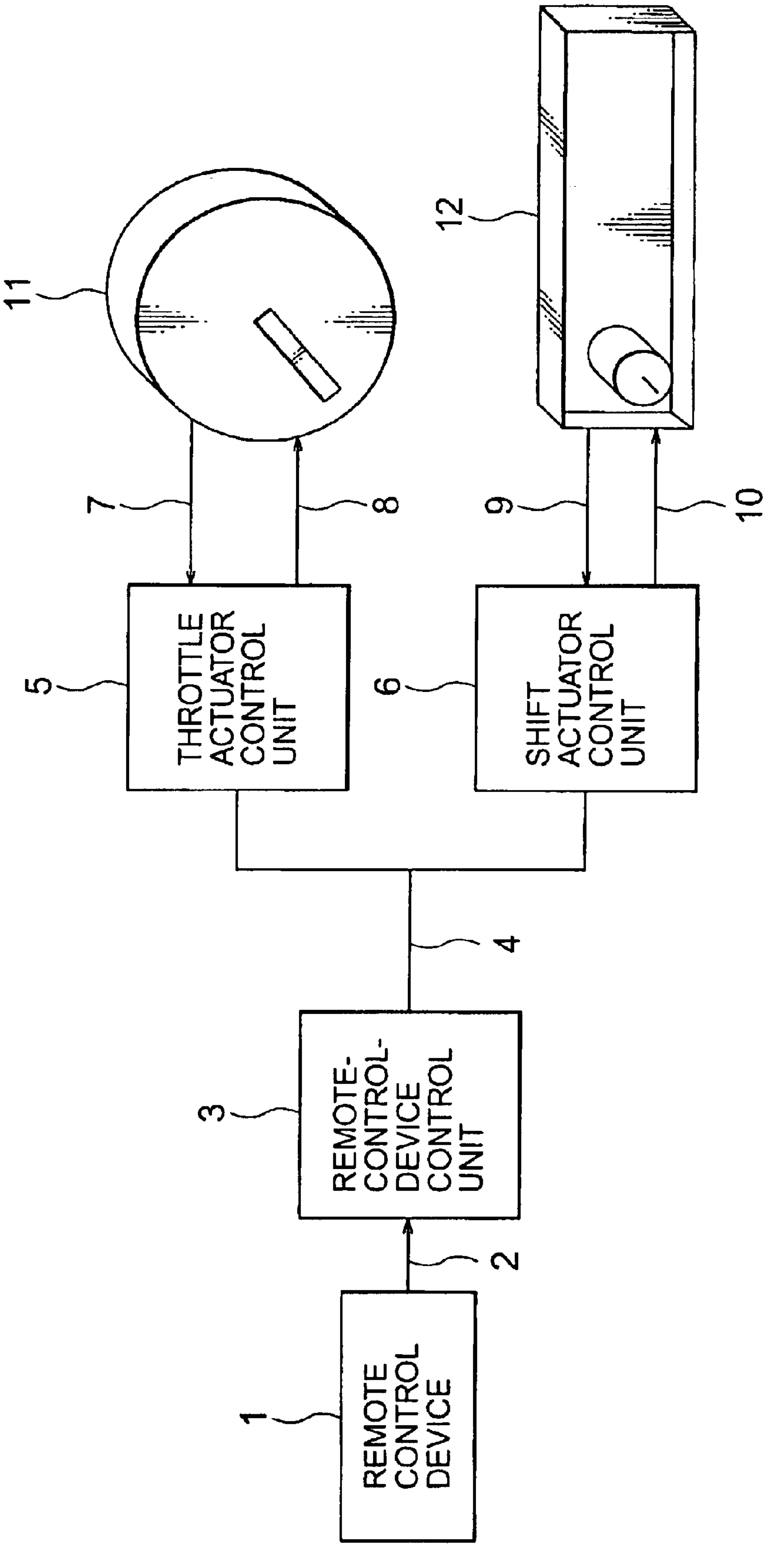
FIG. 1 is a block diagram showing a structure of an electronic controlled drive apparatus according to an embodiment of the present invention.

Hereinafter, an embodiment of the present invention will be described with reference to the drawings. In an electronic controlled drive apparatus according to this embodiment, a remote control device and a shift mechanism are electrically connected with each other. Here, an example in which the shift mechanism is actuated by the shift actuator will be described. In this time, according to a shift of a power transmission system that transmits the torque of an engine to the axis of a propeller, an operational lever of the boat is moved from the neutral to the forward or the reverse to engage a clutch, thereby shifting a transmission. When the lever is further moved, an opening degree of the throttle increases to increase the number of revolutions. As shown in FIG. 1, the electronic controlled drive apparatus according to this embodiment includes a remote control device 1 in which a remote-control-device operational lever (not shown) which is operated by a boat driver is provided. A shift lever and a throttle lever are integrated to form the operational lever. The position of the operational lever is outputted as a voltage signal to a wire 2. The remote control device 1 is connected with a remote-control-device control unit 3 through the wire 2. The remote-control-device control unit 3 calculates a target shift position and a target throttle opening degree from the position of the operational lever which is obtained from the wire 2 and conducts communication with another node through a communication line 4. The communication line 4 is composed of a communication line in which BUS connection is made, such as a CAN. The communication line 4 is connected with a throttle actuator control unit 5 and a shift actuator control unit 6 such that they are parallel to each other.

The throttle actuator control unit 5 conducts communication with the remote-control-device control unit 3 through the communication line 4 and controls an electronic control throttle actuator 11. In other words, the throttle actuator control unit 5 obtains a throttle actuator opening degree from the throttle actuator 11 through a wire 7 and outputs a control signal to the throttle actuator 11 through a control line 8 to drive the throttle actuator 11. The throttle actuator 11 opens or closes the throttle of an internal combustion engine according to the target throttle opening degree received as the control signal.

The shift actuator control unit 6 conducts communication with the remote-control-device control unit 3 through the communication line 4 and controls an electronic control shift actuator 12. In other words, the shift actuator control unit 6 obtains a shift actuator position from the shift actuator 12 through a wire 9 and outputs a control signal to the shift actuator 12 through a control line 10 to drive the shift actuator 12. The shift actuator 12 actuates the shift according to the target shift position received as the control signal. Note that the shift actuator control unit 6 includes a memory and a down counter CWait (not shown). The memory stores a map (or a table etc.) for determining a shift actuation waiting time KWait described later based on the current number of revolutions of the engine. The down counter counts down the determined shift actuation waiting time KWait.

Figure 2:
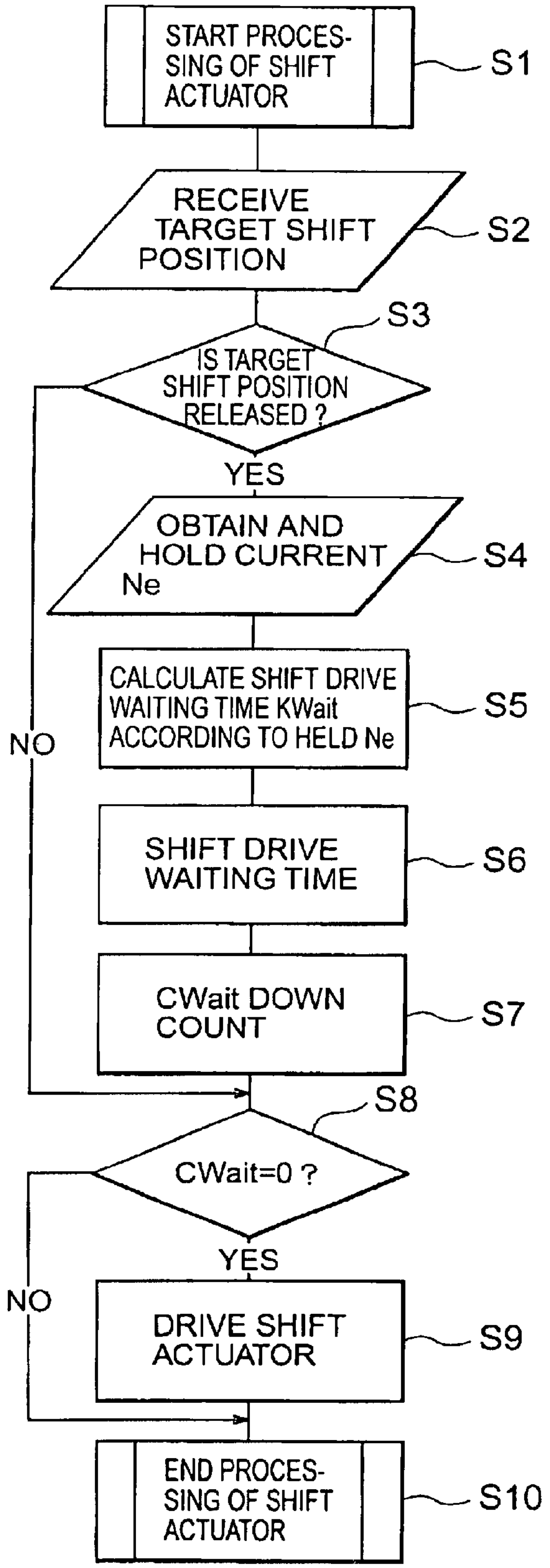
FIG. 2 is a flow chart showing an operation of a shift actuator control unit provided in the electronic controlled drive apparatus according to the embodiment of the present invention.

Next, an operation of the shift actuator control unit 6 will be described with reference to a flow chart shown in FIG. 2. Processing of the shift actuator starts from Step S1. In this case, it is assumed that the remote-control-device control unit 3 calculates a target shift position and a target throttle opening degree from the position of the operational lever and transmits the target shift position and the target throttle opening degree via the communication line 4.

Therefore, in Step S2, the shift actuator control unit 6 receives the target shift position through the communication line 4.

In Step S3, it is determined whether or not the target shift position received in Step S2 is released. If a shift-in state is switched to the neutral (for example: switching from the forward to the neutral), the shift lever and the throttle lever are operated. Accordingly, it is determined that the target shift position is released, and the operation goes to Step S4. On the other hand, when it is determined that the target shift position is not released, the operation goes to Step S8.

After the operation goes to Step S4, the current rotation number of the engine is held in Step S4.

Figure 4:
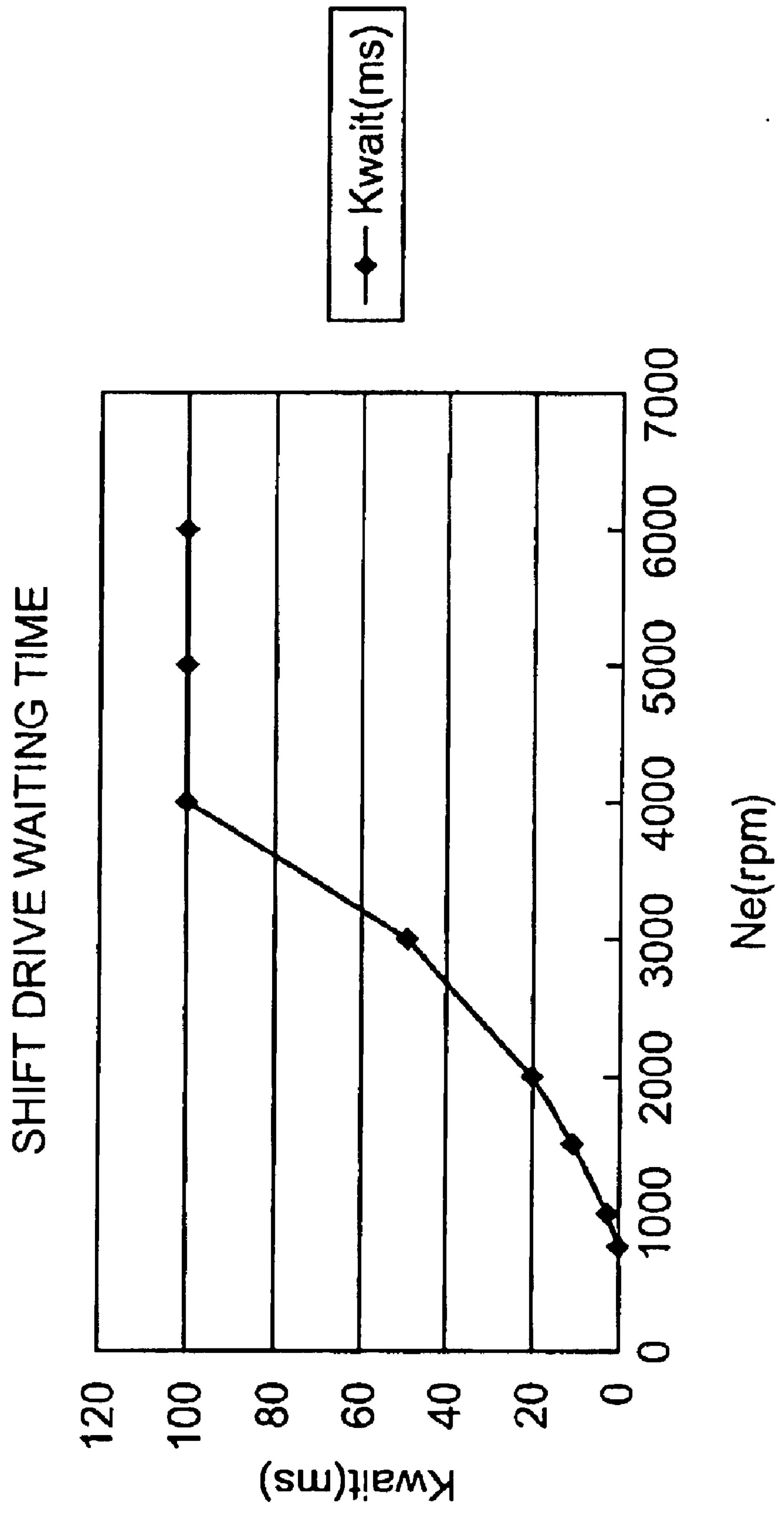
FIG. 4 is an explanatory graph of the map shown in FIG. 3.

Next, in Step S5, a shift drive waiting time KWait is calculated according to the rotation number of the engine, which is held in Step S4. The calculation is conducted using a prepared map or the like. Assume that the map is stored in advance in a memory (not shown) which is provided in the shift actuator control unit 6. FIG. 3 shows an example of a prepared shift drive waiting time map. In other words, a value of the shift drive waiting time KWait corresponding to each of the rotation number of the engine is shown in FIG. 3. In addition, FIG. 4 is a graph showing the map. In FIG. 4, the abscissa indicates the current rotation number of the engine and the ordinate indicates the shift drive waiting time. Therefore, for example, when the shift is released during high speed rotation, a long shift drive waiting time is set, so that a sufficient waiting time is provided for the rotational speed of the drive axis of the propeller to be sufficiently reduced. On the other hand, a short shift drive waiting time is set during low speed rotation, so that an effect can be expected in which it is unnecessary to wait for the rotational speed of the drive axis of the propeller to be reduced. Note that, if design is made allowing a user to change the value on the map as required according to a use condition and the like, more comfortable drive can be expected and an improvement in terms of convenience is attained.

In Step S6, the shift drive waiting time KWait obtained in Step S5 is assigned to the down counter CWait.

In Step S7, the down counter CWait counts down. Note that, in this embodiment, the down counting starts immediately after (or upon) the release of the target shift position (shift-in state is switched to the neutral).

In Step S8, it is determined whether or not a value of the down counter CWait is 0. If the value is 0, it is determined that the shift drive waiting time has elapsed and then the operation goes to Step S9. On the other hand, if the value is not 0, the operation goes to Step S10 and the processing is ended.

When the operation goes to Step S9, the shift actuator is driven in Step S9.

Note that, with respect to a shape of the remote control device in the marine field, there are a shape in which the shift lever and the throttle lever are integrally formed and a shape in which the shift lever and the throttle lever are separately formed.

In the case of the remote control device in which the shift lever and the throttle lever are separately formed, the shift and the throttle can be independently operated. Thus, when the throttle operation is conducted after the shift is released, the rotation number of the engine changes.

Even in the case of the remote control device in which the shift lever and the throttle lever are integrally formed, for example, when the remote control operations of switching from the forward (F) to the neutral (N) and switching from the neutral (N) to the reverse (R) are conducted within a short period of time, there is a possibility that the throttle is opened before the shift actuator reaches an R-position and thus the shift enters the R-position in a state in which the rotation number of the engine is high.

As in the above-mentioned example, here, if the throttle is driven during the shift drive waiting time (while the down counter CWait counts down) to vary the rotation number of the engine, the shift drive waiting time obtained in Step S5 becomes null. In order to avoid this and to enable smooth shift-in (switching from the neutral to the reverse or switching from the neutral to the forward), the throttle is closed.

Figure 5:
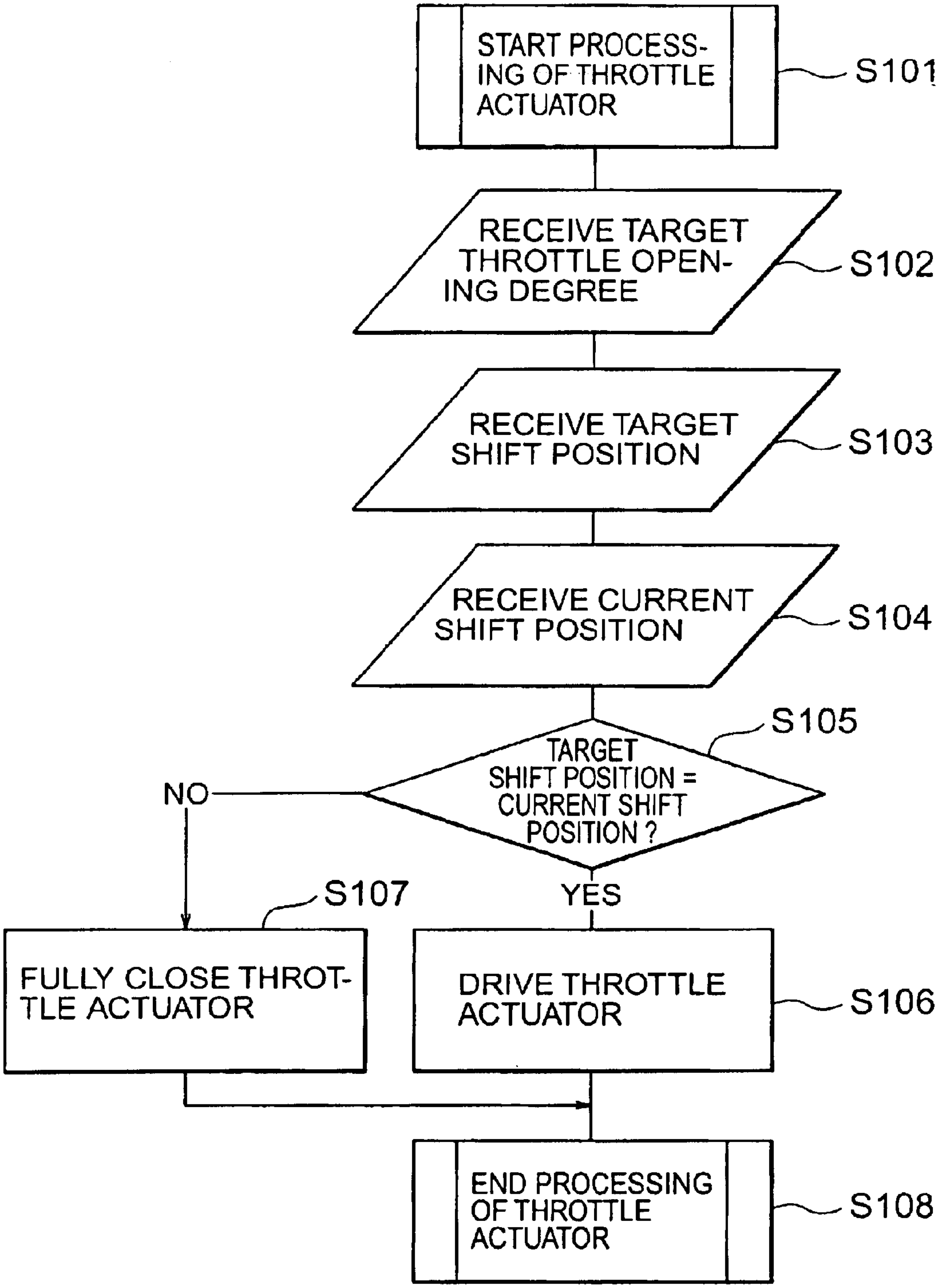
FIG. 5 is a flow chart showing an operation of a throttle actuator control unit provided in the electronic controlled drive apparatus according to the embodiment of the present invention.

Hereinafter, an operation of the throttle actuator control unit 5 will be described with reference to FIG. 5. Processing of the throttle actuator starts from Step S101.

In Step S102, a target throttle opening degree which is transmitted from the remote-control-device control unit 3 is received through the communication line 4.

In Step S103, a target shift position which is transmitted from the remote-control-device control unit 3 is received through the communication line 4.

In Step S104, a current shift position which is transmitted from the shift actuator control unit 6 is received through the communication line 4.

In Step S105, it is determined whether or not the target shift position received in Step S103 coincides with the current shift position received in Step S104. When both positions coincide with each other, it is determined that the throttle actuator can be driven, and then the operation goes to Step S106. On the other hand, when both positions do not coincide with each other, the operation goes to Step S107.

In Step S106, the throttle actuator is driven such that the opening degree of the throttle becomes the target throttle opening degree received in Step S102.

When it is determined in Step S105 that the target shift position does not coincide with the current shift position, the throttle actuator is driven in Step S107 so as to fully close the throttle.

In Step S108, a series of processings of the throttle actuator control unit 5 are ended.

Figure 6:
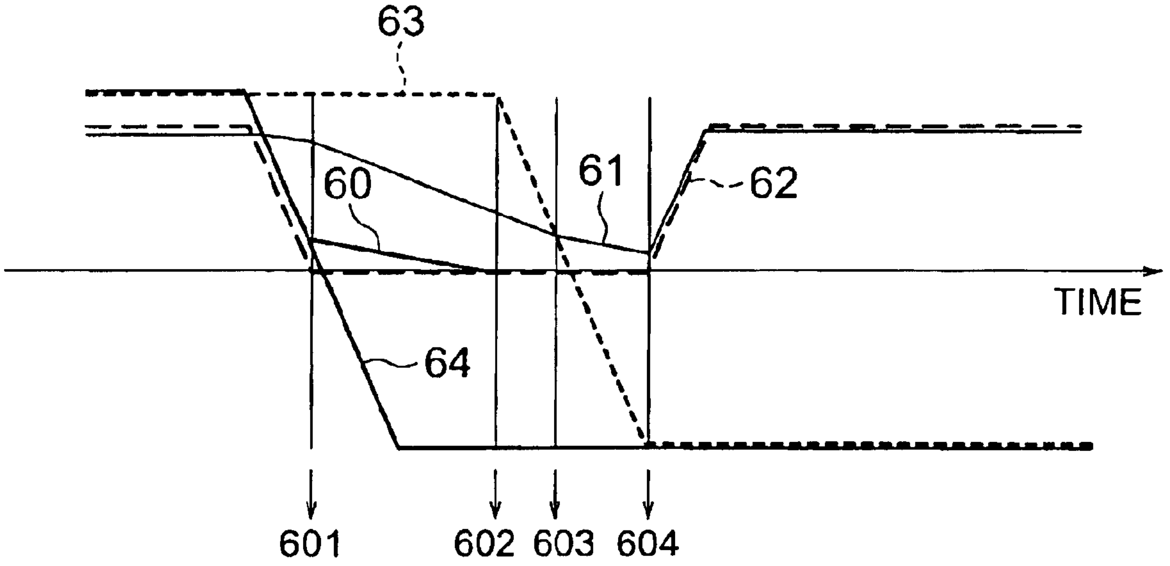
FIG. 6 is a timing chart showing an operational timing of the electronic controlled drive apparatus according to the embodiment of the present invention.

FIG. 6 is an operational timing chart of this embodiment. The timing chart shows the operations of switching from the forward (F) to the neutral (N) and switching from the neutral (N) to the reverse (R). In FIG. 6, reference numeral 60 denotes the change of a shift drive waiting time (Cwait); 61, the change of the rotation number of the engine; 62, the change of a current throttle opening degree; 63, the change of a current shift position; and 64, the changes of a target shift position and a target throttle opening degree. Reference numeral 601 denotes a time when the target shift position is released (switching from F to N); 602, a time when the shift drive waiting time becomes 0 (CWait=0); 603, a time when the current shift position is released (switching from F to N); and 604, a time when the current shift position is shifted in (switching from N to R). As shown in FIG. 6, even if the target shift position and the target throttle opening degree (remote control position) change, the current shift position is shifted in (that is, the shift actuator is operated) after a lapse of the shift drive waiting time according to the flow chart of the shift actuator as shown in FIG. 2. During this time, the current throttle opening degree becomes 0. That is, during the time in which the target shift position does not coincide with the current shift position, the throttle actuator is driven to fully close the throttle according to the flow chart of the throttle actuator as shown in FIG. 5. Because the shift actuator is operated after a lapse of the shift drive waiting time and thus the shift enters to the R-position in a state in which the rotation number of the engine is sufficiently reduced, a load resulting from reverse drive power is small. Therefore, a fear that a defect such as engine stalling is unlikely to occur.

On the other hand, in the case of the operations of switching from F to N and switching from N to R in the above-mentioned conventional example, the current shift position is shifted after a lapse of a slight response delay time from the target shift position and the target throttle opening degree (remote control position). That is, the shift actuator is operated. However, because the current throttle opening degree becomes such a value that the operation of the throttle actuator is faster than the rotation of the shift actuator and the shift enters the R-position in a state in which the rotation number of the engine is insufficiently reduced, large reverse drive power is transferred. Therefore, there is a fear that a defect such as engine stalling is caused.

As described above, according to this embodiment, the rotation number of the engine when the target shift position is released (shift-in state is switched to the neutral) is held. The waiting time is calculated according to the held rotation number of the engine. Counting of the waiting time starts immediately after the target shift position is released (shift-in state is switched to the neutral). After a lapse of the waiting time, the shift actuator can be driven. Accordingly, by considering the shift drive waiting time in the case where the shift lever is operated, the rotational speed of the propeller is sufficiently reduced. Thus, it is possible to prevent engine stalling which is caused upon shift connection such as shift lever reverse operation, in which the rotational direction of the propeller axis is reverse to the rotational direction of the engine axis and a large load is applied to the engine. In addition, when a shift mechanism is released after the target shift position is released, a time for which the engine and the propeller axis are connected with each other is lengthened, so that a so-called engine brake effect to the propeller can be expected. Therefore, according to this embodiment, shift connection can be conducted after the rotational speed of the drive axis of the propeller is sufficiently reduced, so that a load applied to the engine can be reduced to prevent a defect such as engine stalling. Note that the example in which the remote control device 1, the throttle actuator control unit 5, and the shift actuator control unit 6 are separately constructed is described in this embodiment. However, the present invention is not limited to this example. Therefore, the remote control device 1, the throttle actuator control unit 5, and the shift actuator control unit 6 may be integrally formed. Even in such a case, the same effect is obtained.

Embodiment 2

The example in which counting of the shift drive waiting time starts when the target shift position is released (shift-in state is switched to the neutral) has been described in Embodiment 1. However, the present invention is not limited to this example. Thus, in this embodiment, assume that counting of the shift drive waiting time starts when the shift actuator is released (shift-in state is switched to the neutral). Even in such a case, the same effect can be obtained. The shift connection can be conducted after the rotational speed of the drive axis of the propeller is sufficiently reduced, so that a load applied to the engine can be reduced to prevent a defect such as engine stalling.

Embodiment 3

The example in which holding of the rotation number of the engine performs when the target shift position is released (shift-in state is switched to the neutral) has been described in Embodiment 2. However, the present invention is not limited to this example. Thus, in this embodiment, assume that holding of the rotation number of the engine performs when the shift actuator is released (shift-in state is switched to the neutral). Even in such a case, the same effect can be obtained. The shift connection can be conducted after the rotational speed of the drive axis of the propeller is sufficiently reduced, so that a load applied to the engine can be reduced to prevent a defect such as engine stalling.

What is claimed is:

1. An electronic controlled drive apparatus that conducts drive control of an internal combustion engine which is provided in a moving vehicle, comprising:

control means having an operational lever;

target value calculating means for calculating a target throttle opening degree and a target shift position based on an inputted position of the operational lever;

a throttle actuator that opens or closes a throttle of the internal combustion engine in accordance with the target throttle opening degree by a control of the control means;

a shift actuator that actuates a shift in accordance with the target shift position by a control of the control means;

engine rotation number holding means for obtaining an engine rotation number when the target shift position is released and holding the obtained engine rotation number; and waiting time calculating means for calculating a shift drive waiting time in accordance with the held engine rotation number, wherein the control means starts counting of the shift drive waiting time when the target shift position is released, and allows the shift actuator to be driven after a lapse of the shift drive waiting time.

2. An electronic controlled drive apparatus that conducts drive control of an internal combustion engine which is provided in a moving vehicle, comprising:

control means having an operational lever;

target value calculating means for calculating a target throttle opening degree and a target shift position based on an inputted position of the operational lever;

a throttle actuator that opens or closes a throttle of the internal combustion engine in accordance with the target throttle opening degree by a control of the control means;

a shift actuator that actuates a shift in accordance with the target shift position by a control of the control means;

engine rotation number holding means for obtaining an engine rotation number when the target shift position is released and holding the obtained engine rotation number; and waiting time calculating means for calculating a shift drive waiting time in accordance with the held engine rotation number, wherein the control means starts counting of the shift drive waiting time when the shift actuator is released, and allows the shift actuator to be driven after a lapse of the shift drive waiting time.

3. An electronic controlled drive apparatus that conducts drive control of an internal combustion engine which is provided in a moving vehicle, comprising:

control means having an operational lever;

target value calculating means for calculating a target throttle opening degree and a target shift position based on an inputted position of the operational lever;

a throttle actuator that opens or closes a throttle of the internal combustion engine in accordance with the target throttle opening degree by a control of the control means;

a shift actuator that actuates a shift in accordance with the target shift position by a control of the control means;

engine rotation number holding means for obtaining an engine rotation number when the shift actuator is released and holding the obtained engine rotation number; and waiting time calculating means for calculating a shift drive waiting time in accordance with the held engine rotation number, wherein the control means starts counting of the shift drive waiting time when the shift actuator is released, and allows the shift actuator to be driven after a lapse of the shift drive waiting time.

* * * * *